Feb. 14, 1928.
A. F. RUTHVEN
1,659,498
SELF GRINDING VALVE
Filed Feb. 12, 1927
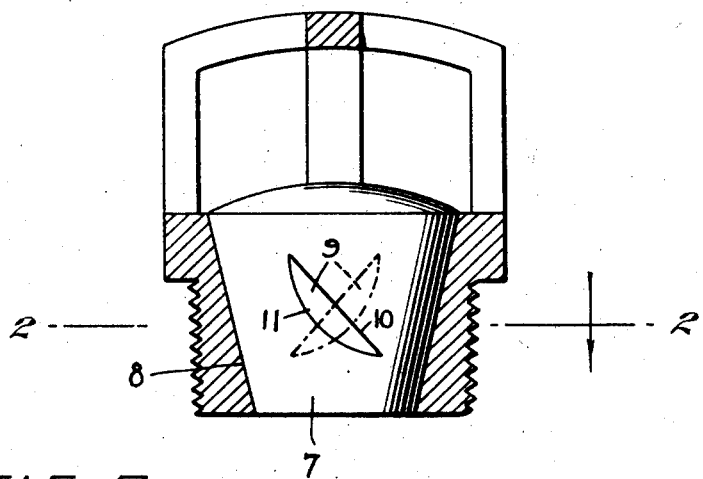
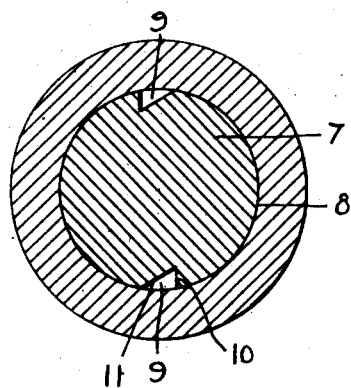
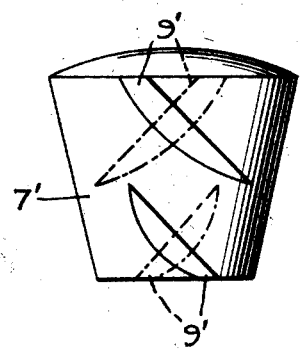
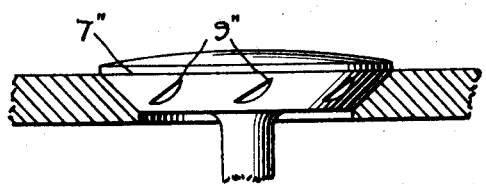
Inventor:
A. F. Ruthven
By Monroe E. Miller
Attorney.

Patented Feb. 14, 1928.

1,659,498

UNITED STATES PATENT OFFICE.

ALBERT F. RUTHVEN, OF CLEVELAND, OHIO.

SELF-GRINDING VALVE.

Application filed February 12, 1927. Serial No. 167,708.

The present invention relates to check valves, and has for its primary object the provision of a novel and improved self grinding valve.

Another object is the provision of a frusto-conical valve member or plug having novel provision thereon whereby such valve member is turned when it is unseated by the flow of fluid past the valve member, and is thereby intermittently turned in its seat, so that the wear on the valve member and seat will be distributed to keep a snug fit between the valve member and seat.

With the foregoing and other objects in view, the invention resides in the novel grooving or recessing of the valve member as hereinafter described and claimed, it being understood that changes can be made within the scope of what is claimed, without departing from the spirit of the invention.

The invention is illustrated in the accompanying drawing, wherein—

Figure 1 is a side elevation of a valve member or plug embodying the improvements, showing the valve seat in diametrical section.

Fig. 2 is a cross section on the line 2—2 of Fig. 1.

Fig. 3 is a side elevation of a valve member or plug illustrating a modification in the improvement.

Fig. 4 is a side elevation of a poppet type of valve head such as used in internal combustion engines, and embodying the improvement.

The valve member or plug 7, as seen in Figs. 1 and 2, is of frusto-conical form, with its smaller end lowermost as shown, to seat in the tapered or frusto-conical seat 8, the valve being a check valve, as shown, such as used in pumps of various kinds and for other purposes.

In carrying out the invention the conical surface of the valve member which bears against the valve seat is formed with any suitable number of oblique or inclined grooves or recesses 9, which may be inclined at any suitable angle, and, as shown in Figs. 1 and 2, the upper and lower ends of these grooves are spaced from the upper and lower extremities, respectively, of the conical seating surface of the valve member, so that the fluid cannot flow into or through the grooves when the valve member is seated. The upper walls of the grooves are so formed, as seen in Fig. 2, as at 10, to form deflecting surfaces against which the fluid impinges when flowing upwardly between the valve member and its seat, to give a turning impetus to the valve member, in order that the fluid will effectively turn such valve member. The lower walls of the grooves are bevelled, as at 11, to facilitate the impinging of the fluid against the walls or surfaces 10 in the upward flow of the fluid past the valve member.

The grooves being located in the seating surface of the valve member will result in the effective turning of the valve member due to the fact that the grooves are presented directly to the stream of fluid as it flows between the valve member and its seat. The grooves will also assist in loosening any particles or coating adhering to the valve seat, and any sand or other particles which may lodge in the grooves will be carried therefrom by the flow of the fluid through the grooves when the valve member is unseated.

Fig. 3 illustrates the grooves 9' as extending to the upper and lower ends of the valve member 7' from an intermediate portion of the valve member, in order that the wear on the valve member and seat may be distributed uniformly between the larger and smaller diametered portions of the valve member. The grooves thus extend, when considered in their entirety, throughout the length of the valve member, thereby equalizing wear and increasing the efficiency of the turning movement of the valve member by the action of the fluid. Any sand or particles remaining in the lower grooves 9' may gravitate downwardly and discharge through the lower open ends of said grooves when the valve member has seated. Either the upper or the lower grooves may be used without the others, and the upper and lower grooves when used jointly are in staggered or offset arrangement circumferentially of the valve member to space them apart as far as possible.

Fig. 4 illustrates the improvement embodied in the poppet valve of an internal combustion engine, the valve head 7" of usual form being provided in its frusto-conical seating surface with grooves 9" similar to the valve member 7, in order that the gas or fluid flowing between the valve member and its seat will turn the valve member or head, it being understood that the valve head or member is free to rotate.

The present valves are self-grinding inasmuch as they are turned during their unseating and seating movements, and by turning the valve members the wear between the valve members and seats is distributed uniformly to maintain a snug fit, and to avoid uneven wearing and leakage such as results by the constant reciprocation of a non-rotatable valve member or plug.

The improvement is extremely simple, but is nevertheless efficient, and the grooves may be cut in frusto-conical valve members already in use.

Having thus described the invention, what is claimed as new is:—

1. A frusto-conical valve member having grooves in its seating surface for causing the valve member to turn by the action of the fluid which flows between the valve member and its seat.

2. A frusto-conical valve member having inclined grooves in its seating surface, the upper walls of the grooves being formed for the impinging thereagainst of the fluid flowing between the valve member and its seat, and the lower walls of the grooves being bevelled.

3. A frusto-conical valve member having spaced inclined grooves in the surface thereof which is intended to bear against the valve seat.

4. A frusto-conical valve member having a smooth conical surface with spaced inclined grooves therein, the grooves being in that portion of said surface which is intended to bear against the valve seat and being of such form as to cause the valve member to turn by the action of the fluid which flows between the valve member and seat.

In testimony whereof I hereunto affix my signature.

A. F. RUTHVEN.